Nov. 3, 1953 F. W. HUNYADY 2,657,768
FULL-FLOATING BRAKE

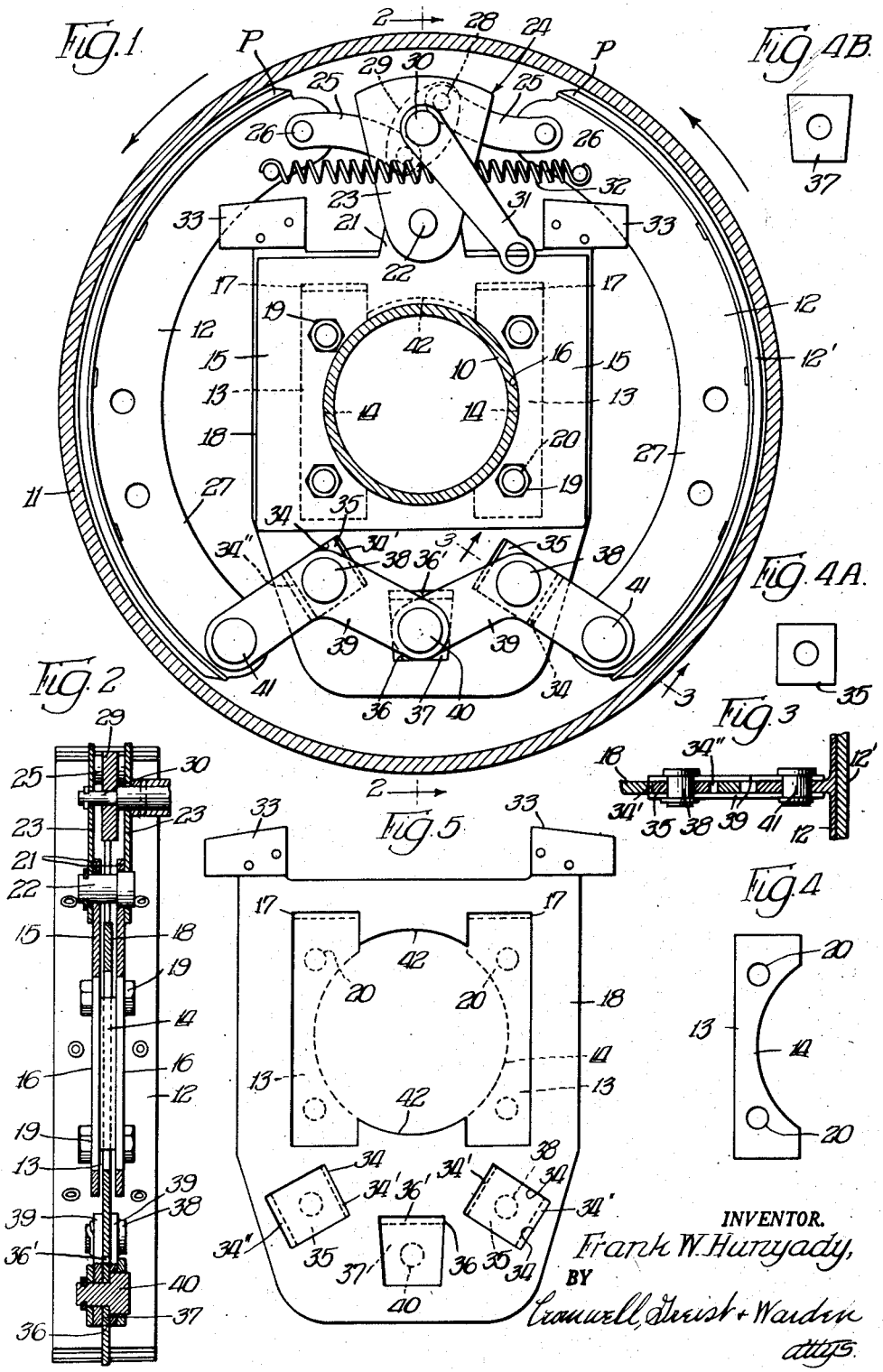

Filed Dec. 31, 1947 2 Sheets-Sheet 2

INVENTOR.
Frank W. Hunyady,
BY
Cromwell, Greist & Warden
attys

Patented Nov. 3, 1953

2,657,768

UNITED STATES PATENT OFFICE 2,657,768

FULL-FLOATING BRAKE

Frank W. Hunyady, Chicago, Ill.

Application December 31, 1947, Serial No. 794,931

22 Claims. (Cl. 188—78)

1

This invention relates to improvements in a brake mechanism adapted to be actuated either mechanically, hydraulically, by a combined mechanical-hydraulic system, or in any other desired fashion.

This is a continuation-in-part of my copending application, Serial No. 630,838, filed November 26, 1945, now abandoned.

It is an object of the invention to provide a greatly simplified, internal expanding brake of the type described having provisions for semi-automatically bringing a plurality of brake shoes into full frictional engagement with a rotating brake drum following initial application of expanding force thereto.

A further object is to provide a brake of the type described having a plurality of arcuate shoes and simplified means for automatically causing engagement of the shoes with the drum by equal forces applied at opposite ends thereof, notwithstanding the fact that the initial expansive force is brought to bear on one end only of each shoe.

Yet another object is to provide a brake of the type described adapted for association with an axle housing or other fixed support, including a novel floating anchor element in floating relation to said support, upon which the devices to accomplish the aforesaid equalized brake engaging action are mounted, whereby complete equalization of the distribution of braking effect is insured, regardless of manufacturing inaccuracies or inequalities in the parts.

A still further object is to provide a brake mechanism of the type described which is simple and inexpensive in construction and effects the automatic completion of the brake applying cycle following a slight initial movement of the brake shoes, thereby contributing a very desirable ease of operation.

Another object is to provide a brake having a cushioned semi-automatic operating characteristic by reason of a pivoted lever-type linkage incorporated therein, said linkage being operatively connected to the brake shoes and floatingly fulcrumed for free shifting during operation, so as to apply full equalized braking pressure to both shoes under a frictional torque or twisting effect between the rotating drum and the shoes.

The foregoing statements are indicative in a general way of the nature of the invention, but other and more specific objects will be apparent to those skilled in the art upon a full understanding of the construction and operation of the device.

One embodiment of the invention is presented

2 herein for the purpose of exemplification, but it will be appreciated that the invention is susceptible of incorporation in other modified forms coming equally within the scope of the appended claims.

In the drawings,

Fig. 1 is a face view illustrating the brake of the invention as mounted on an axle housing with the shoes thereof in operative relation to a rotatable brake drum;

Fig. 2 is a view in section on a line corresponding to line 2—2 of Fig. 1, further illustrating the relationship of the parts of the brake mechanism, the brake drum and axle housing being omitted;

Fig. 3 is a view in section on a line corresponding to line 3—3 of Fig. 1;

Figs. 4, 4A and 4B are face views of certain mounting and centering guide elements employed in the brake mechanism;

Fig. 5 is a face view of a novel floating anchor plate constituting an important element of the invention, the operative position of the guide means of Fig. 4 with relation to the anchor plate being indicated in dotted line.

Figure 6:
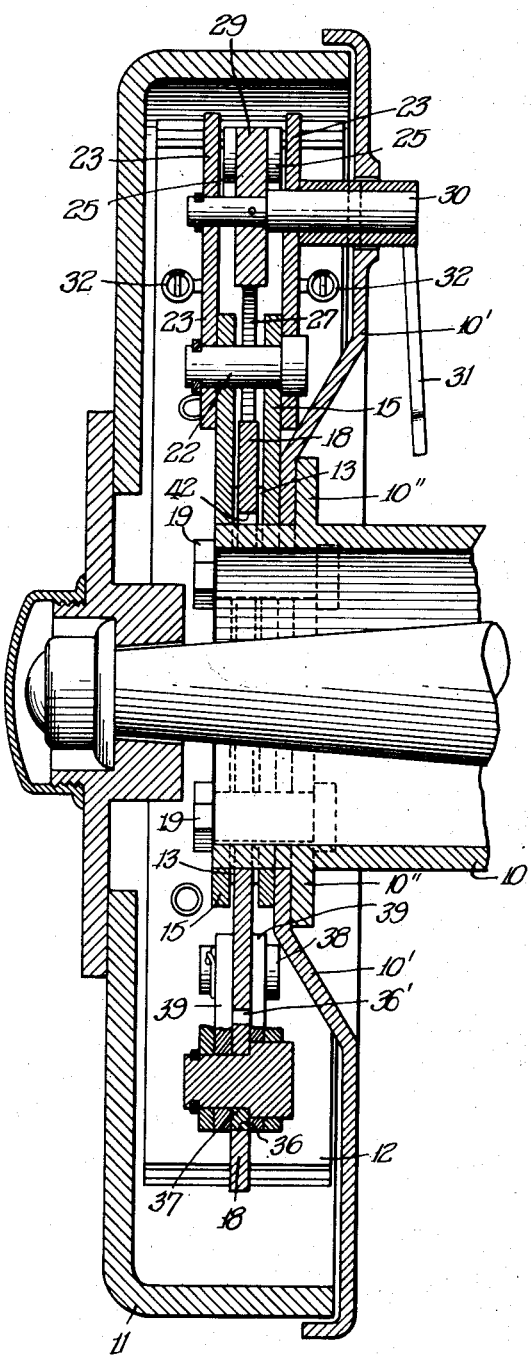
Fig. 6 is a sectional view generally similar to Fig. 2, illustrating the device of Fig. 2 operatively associated with the brake drum, cover plate and axle housing.

The present invention affords a highly simplified brake mechanism, adapted to be actuated by a mechanical linkage, by a hydraulic system or any desired or known combination of such linkage and system for the purpose of affording a uniform and equalized distribution of the braking action, hence uniform resultant wearing action on the shoes throughout the area of the shoes. In attaining these objects, a longer life of the parts is obtained and more satisfactory operation accomplished. The invention resides primarily in the provision of means whereby the brake shoes are automatically brought into full frictional braking engagement with a rotating brake drum following the application of a relatively small initial expansive force to the shoes, the rotative frictional drag of the drum on the shoes being availed of for this purpose. As a still further feature of invention, the mechanism embodies a floating mount or anchor plate for the shoe actuating linkage, to negative the effects of manufacturing inaccuracies, which would otherwise result in non-uniform application of the braking forces.

Referring to the drawings, wherein a preferred embodiment of the invention is illustrated, the reference numeral 10 in general designates a conventional tubular axle housing on which the mechanism of the invention is mounted as a primary support, and the reference numeral 11 designates a conventional rotating brake drum with which the arcuate brake shoes 12 of the mechanism coact in the usual fashion. These shoes are furnished with conventional drum engaging faces 12' of brake material.

Referring to Fig. 4, I illustrate one of two like, oppositely disposed guide plates 13 which, in operative position of the mechanism, are disposed at either side of the axle housing 10 with the arcuate inner faces 14 thereof in concentric encircling and clamping relation thereto, as indicated in broken lines in Fig. 5. These guides 13 are adapted to be confined and fixedly clamped between a pair of generally rectangular side plates 15, each of which has a central circular opening 16 of the same radius of curvature as the axle housing and the internal arcuate surface 14 of the referred to guide plates. However, prior to assembling the guide and side plates 13, 15, the former are disposed in elongated floating guide recesses 17 in the one-piece floating anchor plate 18 illustrated in Fig. 5. The recesses 17 are somewhat longer than the lengthwise dimension of the guides 13, as illustrated in Figs. 1 and 5, and the thickness of anchor plate 18 is somewhat less than that of guides 13, whereby the latter project as a lateral spacer on either side of plate 18 to permit free vertical sliding movement of said plate 18 between side clamping plates 15, by reason of the elongated character of recesses 17.

So assembled, the parts 13 and 18 are confined on either side surface by the plates 15 and this assembly is secured together and to the axle housing 10 and cover plate 10' (to be hereinafter referred to, and shown in Fig. 6) by the bolts 19, which extend through appropriate aligned openings 20 in the guides and side plates. With the latter positioned on the axle housing 10 in the manner shown in Fig. 1, it will be understood that the anchor plate 18 is capable of free vertical sliding movement with relation to the axle housing 10, guides 13 and side plates 15, as illustrated in Fig. 2. This compensates for any inaccuracies of manufacturing or assembly enabling equalized application of the braking force notwithstanding such inaccuracies, as will be described.

At the upper ends and centrally thereof the side plates 15 are each provided with a projecting ear 21, which ears are apertured for the reception of a pivot pin 22. Said pin pivots a pair of swingable equalizing plates 23 on the opposite outer sides of the ears 21. The plates 23 serve as a swingable, self-compensating force-equalizing support for a brake applying linkage 24 which is articulated to the brake shoes 12 and the plates 23. This linkage consists of the curved thrust links 25 disposed in parallel pairs between said plates. The links of each pair are pivoted on their outer end at 26 to the web 27 of the brake shoe 12, and at their inner ends pairs of links is pivoted by a small pin 28 to an eccentric actuating member or crank 29. This crank is disposed between swingable plates 23 and is fixed at a point centrally between said pins 28 to a control shaft 30. Shaft 30 is appropriately journaled on the swinging side plates 23 and extends outwardly from one side of the mechanism, at which point it is secured to an actuating lever 31. Hence, actuation of lever 31 results in pivoting of crank 29 and thrusting of the link pairs outwardly, thereby initially applying shoes 12 to the drum 11 at points P adjacent the ends of the shoes. The swingable character of the plates 23 which mount crank 29 insures the ultimate equalization of thrust of the shoes at points P regardless of manufacturing inaccuracy in the parts, etc.

Coil springs 32 connected in tension between the opposite brake shoes serve to urge the same inwardly to inactive position and the shoes will be thrust outwardly in opposition to this spring.

A pair of spaced brackets 33 spot-welded on either upper corner of the anchor plate serve as guide and aligning elements on opposite sides of the brake shoe flange 27 to guide the floating anchor plate 18 in its vertical compensating movement relative to the guide plates 13, as will be described.

At its lower end the anchor plate 18 is provided with a pair of laterally spaced, angularly disposed, downwardly and outwardly divergent, slotted guide and cam ways 34. These receive the rectangular shoe-like bearings 35, of the type shown in Fig. 4A, for guided, sliding movement in said ways, it being observed that inside and outside clearances 34', 34'', respectively, exist on either side of said bearings. The bearings are shown in a neutral or inoperative condition of the brake. A further vertically disposed slot or way 36 provided with downwardly convergent side margins at about 5° to the vertical is located between and below the ways 34 and serves to receive a further shoe-like bearing 37, illustrated in Fig. 4B, for vertical movement in the way, with a clearance 36' above the bearing. The side edges of bearing 37 are also at 5° to the vertical and space is provided in way 36 above said bearing to accommodate upward shifting thereof, it being noted that this will afford lateral clearance in the way as the bearing moves upwardly. Clearance space is also provided in the ways 34 for movement of bearings 35 in either direction.

The bearings 35 each have fulcrumed thereon at 38 the central portion of a pair of parallel bell cranks 39 and the adjacent ends of said pairs of bell cranks are pivoted in overlapped relation on the central sliding bearing 37 at 40. The opposite ends of each pair of bell cranks 39 are pivoted at 41 to the sides of the brake shoe web 27 at the end thereof opposite point P.

The bearings 35, 37 for the bell cranks 39 are embodied in the form of generally rectangular shoes having a guided sliding fit in the ways 34, 36, since the heavy thrust forces preclude the use of a bearing of restricted thrust-transmitting area. The elongated lateral surfaces of the bearings 35, 37 are engageable in the ways 34, 36 respectively to transmit the thrust under a very moderate unit pressure.

Referring to Fig. 6, wherein the mechanism is shown assembled with a standard axle housing 10, cover plate 10' and drum 11, it will be noted that the bolts 19 engage through said cover plate to secure the latter, along with the side plates 15 and spacing guides 13, to the peripheral flange 10'' on the axle housing. This transversely centers the shoes 12 and various plates, bearings, etc. relative to the drum, so that all thrust is transmitted directly parallel with the plates to the axle housing. There is no occasion for the use of supporting pins or other transverse mounting elements to center the shoes and sustain or transmit thrust, all of which give rise to objectionable stresses and increase the likelihood of a shortened life or decreased dependability in the brake.

In operation, upon actuation of lever 31 and resultant outward thrust of the links 25, the brake shoes 12 are initially engaged outwardly with the drum 11 at points P adjacent the respective shoe ends. The application of relatively slight force to lever 31 accomplishes this engagement after which the remainder of the shoes is applied in an automatic, fully equalized and cushioned fashion. Assuming a direction of rotation of the drum as indicated by the arrows in Fig. 1, the frictional drag on the left-hand shoe at point P near the upper end thereof causes the shoe to be urged downwardly and to the left as viewed in Fig. 1. As a consequence of this shift of the shoe, the left-hand lower bell crank 39 is caused to pivot on its bearing 35, thereby drawing the central bearing 37 upwardly in its way 36, occupying part of clearance space 36'. This simultaneously causes left-hand bearing 35 to travel outwardly in its way 34 into the clearance 34'', the bearing being slidingly and floatingly guided in, as well as cammingly engageable with, the way, with the result that the remainder of the left-hand shoe 12 is applied to the drum under full braking force. Of course, a like simultaneous outward thrust of the right-hand bell crank causes the other shoe to be applied to the drum at a corresponding opposite point, said last named shoe traveling into engagement with the drum in a direction opposite the counterclockwise direction of rotation of the latter, as illustrated in Fig. 1, with a resultant rapid and highly effective frictional gripping action on the latter.

The upwardly diverging character of the edges of the central guideway 36 permits a slight lateral clearance as the bearing 37 shifts vertically to accommodate lateral play of the linkage and prevent binding of the parts. The application of braking forces on right and left shoes is completely equalized by the foregoing floating type linkage. In other words, the presence of the clearances 34', 34'' and 36' in the ways 34, 36, as well as the lateral clearance in way 36 by reason of its inclined sides, insures that the bearings and linkage may shift freely, though slightly, in whatever direction is necessary to provide equal braking distribution. Bearing 37 alone engages a positive stop at the lower end of its way 36 when the brake is in neutral condition. While the shoes are being applied, the linkage constituted by the levers and bearings represents a floating anchor for the shoes and, when they are fully applied, an abutment through which the forces involved are transmitted to the brake mount.

It will be appreciated that the distances traveled by the bearings 35, 37 and shoes 12 in the foregoing movements are very small so that contact of the full area of the shoes with the drum occurs practically instantaneously following initial actuation of lever 31. Positioning of the shoes for application of full braking torque is obtained in a semi-automatic manner, it being merely necessary to initially engage with the drum at the point P, whereupon consequent full engagement of the brake shoes occurs, under a frictional twisting or torque effect between the drum and shoes, without the application of appreciable further force. Of course, further rotation of lever 31 will increase the braking thrust on the brake shoes proportionately, following the full frictional engagement which is had as a result of the referred to automatic features. It will be understood that upon reverse rotation of drum 11 the right-hand shoe will initially engage at its point P, attended by further automatic radial centering and engagement with the drum in the manner described.

I desire to point out that the further features of the floating plate 18 and swingable plates 23 further contribute to the application of shoes 12 to the drum in an automatically centered, fully compensated or self-equalizing fashion. Thus, should the parts be unidentical due to machining or assembling inaccuracies, the plate 18 merely floats in one direction or another between the fixed side plates 15, guided by plates 13, without the transmission of serious stresses to any part or parts, as might otherwise result. Equal distribution of pressure throughout the brake shoes is insured. The diametrically opposed, arcuate internal surfaces 42 on plate 18 lie adjacent the axle housing 10 in operative relation of the parts and merely serve as stops limiting the plate in its sliding movements referred to. Should all parts be perfectly machined and assembled, the plate 18 will not move appreciably when the mechanism is actuated and the shoes will be applied properly; nor will plates 23 swing on pivot pin 22. However, lacking such perfect matching of the parts, the plates referred to take automatic centering and equalizing movement to insure the same result that perfect tolerances would bring. Hence, it is seen that, while plate 18 serves a function of primary importance in the invention, it may be fabricated in an inexpensive manner, for example in the form of a sheet metal stamping. The other parts may be produced correspondingly cheaply due to the elimination of need to rely on close tolerances discussed above.

I consider that the features of semi-automatic operation, initiated by only a slight actuation of the control lever and completed by the floating linkage, with automatic torsional coaction of the shoes and drum; self-compensation for manufacturing inequalities, due to the floating anchor plate, transverse brake shoe centering and bolting to the cover plate; along with direct transmission and absorption of thrust forces, are distinct and novel advances in the art. I am aware that alterations thereof, well within the principles of the invention, will suggest themselves to those skilled in the art, hence I desire that the invention be construed no more limitedly than is consistent with the scope of the appended claims.

I claim:

1. A brake mechanism comprising a pair of arcuate shoes shiftable in opposite directions for frictional engagement with a drum rotatable about an axis, means operable to initially engage adjacent ends of said shoes with said drum, a support, and opposed links pivotally connected to the respective opposite ends of said shoes, said links each having independent pivotal and slidable camming engagement with said support at points spaced laterally from one another in the general plane of movement of the shoes, and being pivotally engaged with one another whereby shifting of the shoes consequent upon said initial engagement and the frictional drag of the drum effects pivotal and camming motion of the links relative to the support, to thereby apply said opposite ends of the shoes to the drum.

2. A brake mechanism comprising a pair of arcuate shoes shiftable in opposite directions for frictional engagement with a drum rotatable about an axis, a support mounted for floating movement transversely of said axis, manually actuable means carried by the support operable to initially engage adjacent ends of said shoes with said drum, and opposed links pivotally connected to the respective opposite ends of said shoes, said links each having independent pivotal and slidable camming engagement with said support at points spaced laterally from one another in the general plane of movement of the shoes, and being pivotally engaged with one another whereby shifting of the shoes consequent upon said initial engagement and the frictional drag of the drum effects pivotal and camming motion of the links relative to the support, to thereby apply said opposite ends of the shoes to the drum, the floating of said support equalizing the shoe thrust on the drum.

3. A brake mechanism comprising a pair of arcuate brake shoes shiftable in opposite directions for frictional engagement with a drum rotatable relative to an axis, a support, shoe engaging means to initially engage an end of at least one of said shoes with said drum, and a pair of elements each having longitudinally shiftable means pivoting the same to said support at spaced points, said elements being in engagement with respective opposite ends of said shoes, whereby said elements operate to fully apply the shoes to the drum following said initial engagement, the support being mounted for floating movement relative to said drum to insure equalization of force of the shoes on the drum.

4. A brake mechanism comprising a pair of arcuate brake shoes shiftable in opposite directions for frictional engagement with a drum rotatable relative to an axle, a support mounted for floating movement transversely of the axle, shoe engaging means to initially engage an end of at least one of said shoes with said drum, a pair of elements each having longitudinally shiftable means pivoting the same to said support at spaced points, said elements being in engagement with respective opposite ends of said shoes, whereby said elements operate to fully apply the shoes to the drum following said initial engagement, and longitudinally shiftable means pivotally connecting said elements to one another, the support being mounted for floating movement relative to said drum to insure equalization of force of the shoes on the drum.

5. In a brake mechanism, a brake drum, a support, a pair of arcuate brake shoes, shoe actuating means mounted on said support and operatively connected to adjacent ends of said shoes, whereby actuation of said means effects initial frictional engagement of the shoes with the brake drum, a pair of bell cranks each terminally pivoted respectively to the opposite ends of said respective shoes and medially fulcrumed on said support in slidable camming engagement therewith, said bell cranks being pivotally connected to one another at the ends thereof opposite the terminal shoe pivots to complete the application of the shoes to the drum following said initial engagement.

6. In a brake mechanism, a brake drum, a support, an anchor plate guided by said support for linear floating movement transverse the drum axis, a pair of arcuate brake shoes, shoe actuating means mounted on said support and operatively connected to adjacent ends of said shoes, whereby actuation of said means effects initial frictional engagement of the shoes with the brake drum, a pair of bell cranks each terminally pivoted respectively to the opposite ends of said respective shoes and medially fulcrumed on said anchor plate in slidable camming engamenent therewith, said bell cranks being pivotally connected to one another at the ends thereof opposite the terminal shoe pivots to complete the application of the shoes to the drum following said initial engagement.

7. In a brake mechanism, a brake drum, a support, an anchor plate guided by said support for linear floating movement transverse the drum axis, a pair of arcuate brake shoes, shoe actuating means shiftably mounted on said anchor plate and operatively connected to adjacent ends of said shoes, whereby actuation of said means effects initial frictional engagement of the shoes with the brake drum, a pair of bell cranks each terminally pivoted respectively to the opposite ends of said respective shoes and medially fulcrumed on said anchor plate in slidable camming engagement therewith, said bell cranks being pivotally connected to one another at the ends thereof opposite the terminal shoe pivots to complete the application of the shoes to the drum following said initial engagement.

8. In a brake mechanism, a support, an anchor plate guided by said support for linear floating movement in the plane of the plate, a pair of arcuate brake shoes, shoe actuating means operatively connected to adjacent ends of said shoes to effect initial frictional engagement of the shoes with a brake drum, and a pair of links each pivotally connected to an opposite end of said respective shoes and medially fulcrumed on said anchor plate in slidable camming engagement therewith, said links being pivotally connected to one another at the ends thereof opposite the shoe pivots.

9. In a brake mechanism, a support, an anchor plate guided by said support for linear floating movement in the plane of the plate, a pair of arcuate brake shoes, actuating means operatively connected to adjacent ends of said shoes, whereby manipulation of the actuating means effects initial frictional engagement of at least one of the shoes with a brake drum, and separate means operatively connected to said respective shoes and carried by said anchor plate in longitudinally slidable and translational camming engagement therewith to complete the application of the shoes to the drum following said initial engagement.

10. A brake mechanism comprising a brake drum, brake shoes engageable with said drum, an actuator for said shoes, a plate, and a pair of levers for moving said shoes into engagement with said drum, said levers being operatively engaged with each other and with said respective shoes, and each being floatingly guided by said plate, at points spaced laterally from one another in the general plane of movement of the shoes, for translational movement of one lever independently of the other.

11. A brake mechanism comprising a brake drum, brake shoes engageable with said drum, an actuator for said shoes, an anchor plate, and a pair of levers for moving said shoes into engagement with said drum, said levers being operatively connected at their ends to each other and to said respective shoes and each being floatingly guided between their ends by said anchor plate for translational movement independently of the other.

12. In a brake mechanism, a brake drum, brake shoes engageable with said drum, an actuator for said shoes, a plate, and plural means responsive to engagement of one of said shoes with said drum by said actuator for moving the other of said shoes toward the drum, said respective means being floatingly guided by said plate, at points spaced laterally from one another in the general plane of movement of the shoes, for translational movement independently of one another.

13. In a brake mechanism, a brake drum, brake shoes engageable with said drum, an actuator for said shoes, a plate, and plural means responsive to rotation of said drum and engagement of one of said shoes with said drum by said actuator for moving the other of said shoes toward the drum in a direction opposite to rotation of said drum, said respective means being floatingly guided by said plate, at points spaced laterally from one another in the general plane of movement of the shoes, for translational movement independently of one another.

14. In a brake mechanism including a drum and brake shoes engageable therewith, a plate, a pair of levers each guided by said plate and having pivotal and bodily movement on said plate at medial points of the levers which are spaced laterally from one another in the general plane of movement of the shoes, adjacent ends of said levers being operatively connected to one another and the opposite ends of said levers being operatively connected to said brake shoes for actuation of the latter upon pivotal movement of the levers.

15. In a brake mechanism, a brake drum, a pair of shoes engageable with said drum, an actuator for moving adjacent ends of said shoes into engagement with said drum, a plate, and a pair of levers operatively connected to said shoes and responsive to engagement of one of said shoes with said drum by said actuator during rotation of said drum, said plate having means positively guiding said levers, at points spaced laterally from one another in the general plane of movement of said shoes, for pivotal and sliding movement to urge the other end of the other of said shoes toward said drum, said levers reacting upon each other to increase the pressure of said shoes upon said drum.

16. In a brake mechanism, a pair of brake shoes, a plate and a pair of levers operatively connected to each other and to the respective shoes, said plate having means providing a common guide for said levers and having further means affording independent, translational sliding guides for each of said levers in spaced relation to said common guide.

17. In a brake mechanism, a pair of brake shoes, a plate and a pair of levers operatively connected to each other at a common pivot and to the respective shoes, said plate having means providing a sliding guide for said levers at the common pivot thereof, and being engageable with said levers at said common pivot to terminate movement thereof at a neutral position.

18. A brake mechanism comprising a brake drum, brake shoes engageable with said drum, an actuator for said shoes, a plate, and a floating anchor for said shoes comprising levers operatively connected to each other and to said shoes, said plate having means floatingly guiding said levers for sliding movement thereon, said levers being responsive to engagement of one of said shoes with said drum for moving the other of said shoes into engagement with said drum, said plate being engageable with said levers to terminate floating movement thereof at a neutral position in which said shoes are disengaged from the drum.

19. In a brake mechanism, a supporting plate provided with a pair of spaced apertures adapted for the reception of slidable lever guides and a further aperture between said apertures for the reception of a further slidable lever guide, each of said apertures having a pair of opposed, longitudinally extending, straight guide restraining and camming sides, the respective sides of certain of said pairs being in non-parallel relation and other of said pairs of sides being parallel.

20. In a brake mechanism, a supporting plate provided with a pair of spaced apertures adapted for the reception of slidable lever guides and a further aperture between said apertures for the reception of a further slidable lever guide, each of said apertures having a pair of opposed, longitudinally extending, straight guide restraining and camming sides, the respective sides of certain of said pairs being in non-parallel relation and those of the remainder of the pairs being parallel.

21. In a brake mechanism, a supporting plate having an axle receiving opening provided with means enabling limited floating movement of the plate relative to an axle received therein, and having a pair of spaced apertures adapted for the reception of slidable lever guides and a further aperture between said apertures for the reception of a further slidable lever guide, each of said apertures having a pair of opposed, longitudinally extending, straight guide restraining and camming sides, the respective sides of certain of said pairs being in non-parallel relation and other of said pairs of sides being parallel.

22. A brake mechanism comprising a brake drum, a pair of brake shoes engageable with said drum, an actuator for said shoes, a plate, levers operatively connected to each other and to said shoes, fulcruming bearings for said levers intermediate their operative connections to each other and to said shoes, and means on said plate guiding said bearings for bodily movement relative to said plate.

FRANK W. HUNYADY.

References Cited in the file of this patent

UNITED STATES PATENTS

| Number | Name | Date |
| --- | --- | --- |
| 1,678,427 | Flanigan | July 24, 1928 |
| 1,738,750 | Loughead | Dec. 10, 1929 |
| 1,875,523 | Taylor | Sept. 6, 1932 |
| 1,992,207 | Goepfrich | Feb. 26, 1935 |
| 1,996,235 | Dodge | Apr. 2, 1935 |
| 2,066,308 | Pomeroy et al. | Dec. 29, 1936 |
| 2,107,092 | Swennes | Feb. 1, 1938 |
| 2,176,204 | Caya | Oct. 17, 1939 |
| 2,246,242 | Chase | June 17, 1941 |
| 2,296,673 | Hunyady | Sept. 22, 1942 |

FOREIGN PATENTS

| Number | Country | Date |
| --- | --- | --- |
| 220,823 | Germany | Apr. 8, 1910 |
| 627,476 | France | Oct. 5, 1927 |